No. 770,661. PATENTED SEPT. 20, 1904.
A. SEDGWICK.
AUTOMATIC FRICTION BRAKE.
APPLICATION FILED JAN. 27, 1904.
NO MODEL. 3 SHEETS—SHEET 2.

Witnesses
C. Munker
L. O. Hilton

Inventor
Alonzo Sedgwick.
By Benj. F. Cowl
Attorney

No. 770,661. PATENTED SEPT. 20, 1904.
A. SEDGWICK.
AUTOMATIC FRICTION BRAKE.
APPLICATION FILED JAN. 27, 1904.
NO MODEL. 3 SHEETS—SHEET 3.

Witnesses
C. Munter
L. O. Hilton

Inventor
Alonzo Sedgwick
By Benj. F. Cowl
Attorney

No. 770,661. Patented September 20, 1904.

UNITED STATES PATENT OFFICE.

ALONZO SEDGWICK, OF POUGHKEEPSIE, NEW YORK.

AUTOMATIC FRICTION-BRAKE.

SPECIFICATION forming part of Letters Patent No. 770,661, dated September 20, 1904.

Application filed January 27, 1904. Serial No. 190,820. (No model.)

*To all whom it may concern:*

Be it known that I, ALONZO SEDGWICK, a citizen of the United States, residing at Poughkeepsie, in the county of Dutchess and State of New York, have invented new and useful Improvements in Automatic Friction-Brakes, of which the following is a specification.

My invention is an improved automatic friction clutch-brake adapted especially for use in connection with dumb-waiters and hand-elevators for stopping the car and starting the same in either direction without jerking or jarring the car, and is an improvement on the automatic friction-clutch for which Letters Patent of the United States No. 625,359 were granted to me May 23, 1899.

One object of my present invention is to simplify the construction and increase the efficiency of the device by providing means independent of the shaft for holding the coacting brake or friction clutch elements.

A further object is to provide coacting brake elements having friction-surfaces of increased area and of greater radius in proportion to the size of the hoisting-wheel or pulley without taking up additional room.

A further object is to increase the number of the coacting brake elements having coengaging frictional surfaces.

A further object is to provide a brake of this class which is independent of the shaft-bearings, so that the same may be adjusted to any desired point on the shaft.

A further object is to provide an improved friction clutch device of this class in which the wear of the frictionally-engaging coacting elements is minimized.

A further object is to provide means for taking up the wear of the frictionally-engaging coacting elements of the clutch device.

With these and other objects in view my invention consists in the construction, combination, and arrangement of devices hereinafter fully described, and pointed out in the claims.

Figure 1:
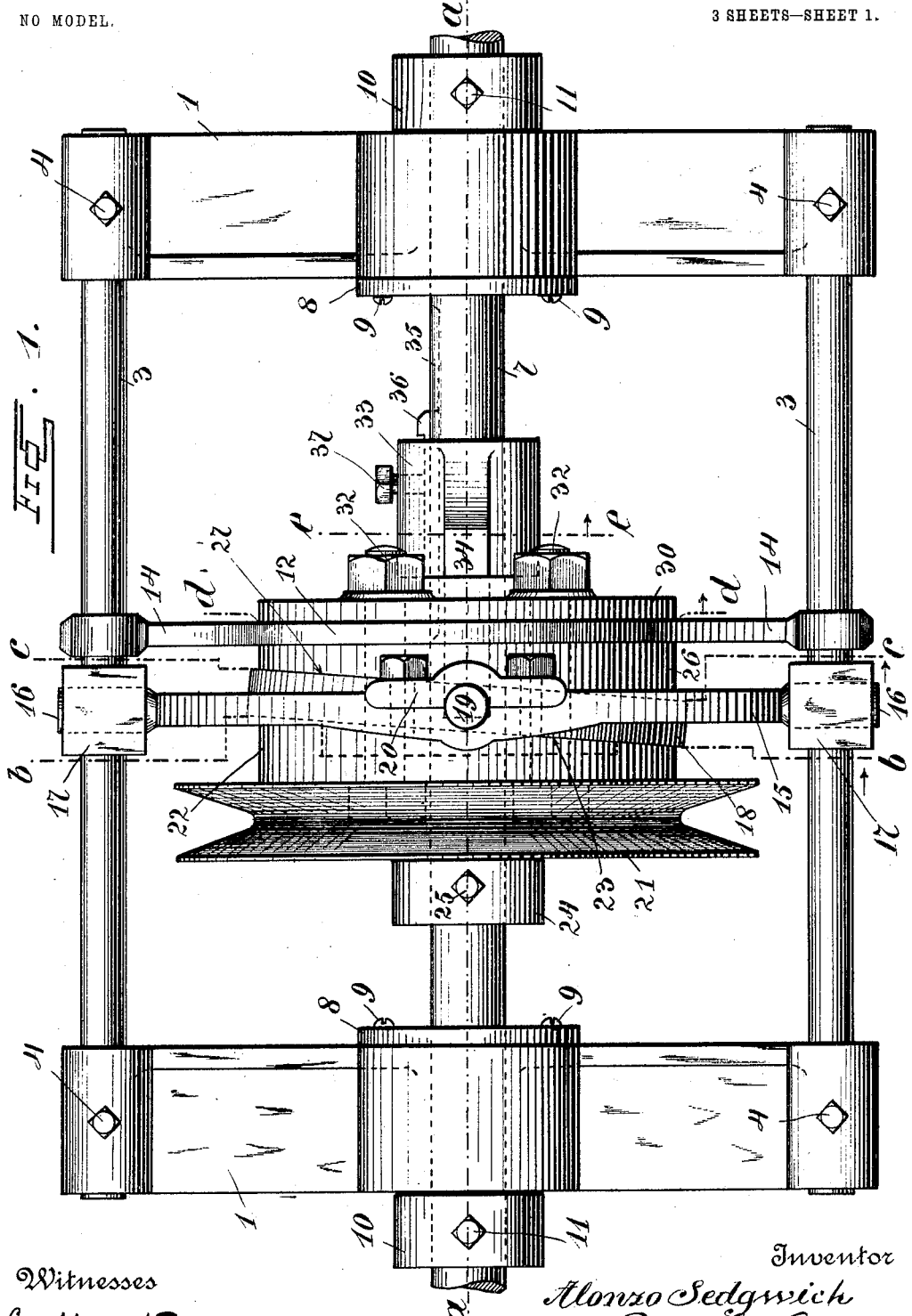
Figure 2:
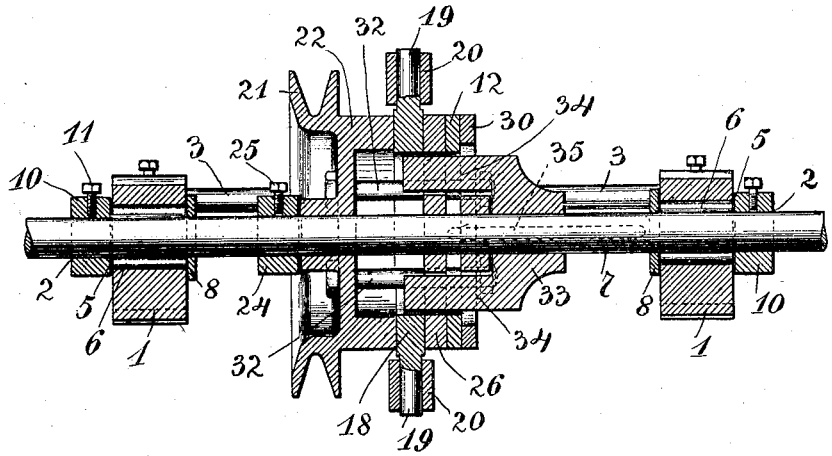
Figures 3, 4:
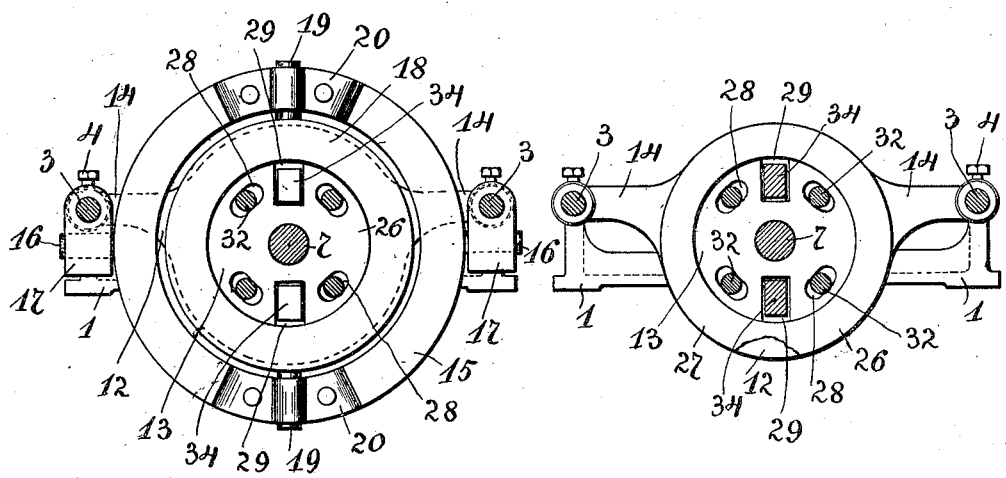
Figure 5:
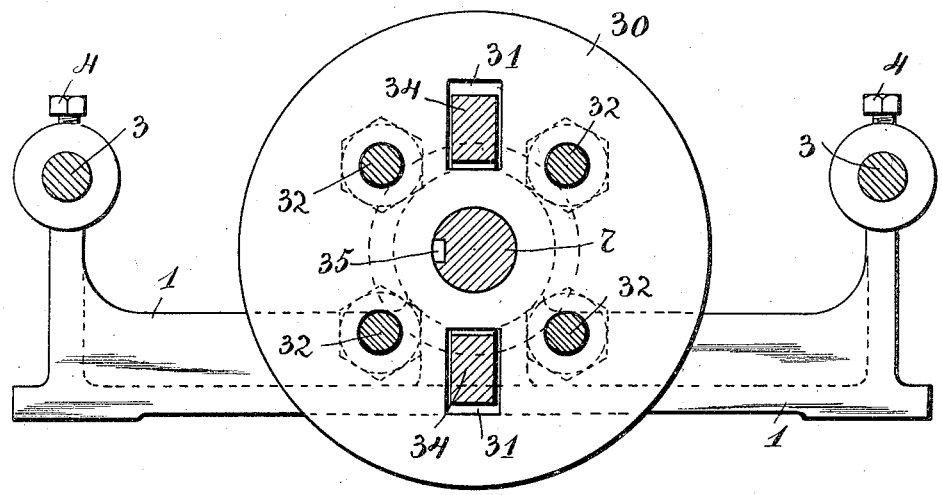
Figure 6:
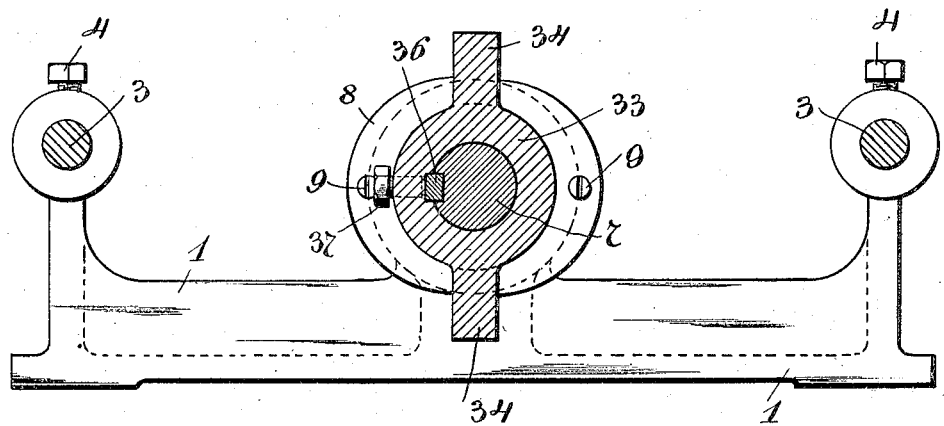

In the accompanying drawings, Figure 1 is a top plan view of an automatic friction clutch-brake device embodying my improvement. Fig. 2 is a vertical longitudinal sectional view of the same, taken on the plane indicated by the line *a a* of Fig. 1. Fig. 3 is a transverse sectional view of the same, taken on the plane indicated by the line *b b* of Fig. 1. Fig. 4 is a similar view taken on the plane indicated by the line *c c* of Fig. 1. Fig. 5 is a similar view taken on the plane indicated by the line *d d* of Fig. 1. Fig. 6 is a detail sectional view taken on the plane indicated by the line *e e* of Fig. 1.

In the embodiment of my invention I employ a pair of supports 1, which are spaced apart to a suitable extent and provided at their ends with openings 2 for the reception of a pair of parallel longitudinally-disposed rods 3, that connect the supports together and are secured thereto by set-screws 4. The supports have central cylindrical alined openings 5, in which are antifriction-rollers 6, that form the bearings for the shaft 7, which in practice is provided at a suitable point with a hand-wheel that is not here shown. The inner ends of the openings 5 are closed by caps 8, secured to the supports by screws 9, and the outer ends of said openings are closed by collars 10, which are secured to the shaft by set-screws 11. These collars prevent endwise movement of the shaft and coact with the caps to retain the bearing-rollers in the openings 5 of the supports.

A brake-plate 12 has a central circular opening 13 of suitable size and oppositely-extending arms 14, having openings near their outer ends through which extend the rods 3. A yoke 15, which is annular in form, has oppositely-extended trunnions 16, which form the pivots thereof and are mounted in bearings 17, that are slidable on and depend from the rods 3. Within the yoke 15 is pivotally mounted a separating-ring 18, the opposite faces of which are parallel and form friction brake-surfaces. The pivot-trunnions 19 of the separating-ring, which are mounted in bearings 20, with which the yoke 15 is provided, are midway between, and hence at right angles to, the pivot-trunnions 16 of said yoke. Hence the separating-ring is mounted for universal angular motion with respect to the shaft 7.

The hoisting-wheel or pulley 21 is loose on the shaft 7 and is provided on its inner side with a hub 22, which has an inclined face 23 to engage one friction-face of the separating-ring 18. A collar 24, secured on the shaft 7 by a set-screw 25, bears against the outer side of said hoisting-wheel or pulley. On the side of the separating-ring opposite that which engages the hub of the hoisting-wheel or pulley is a brake-ring 26, which has an inclined face 27 to engage the separating-ring. This brake-ring is loosely mounted on the shaft 7 and has slots 28 and oppositely-disposed radial openings 29 of suitable width. The outer side of the brake-ring bears against the inner side of the brake-plate 12. Against the opposite side of the brake-plate bears a locking-plate 30, the sides of which are parallel. The locking-plate is loose on the shaft 7 and has oppositely-disposed radial openings 31, which correspond in width with the openings 29 of the brake-ring. Bolts 32 connect the hoisting wheel or pulley with the locking-plate and extend through the slots 29 of the brake-ring 26.

On the shaft 7 is a driver or driving element 33, which has oppositely-extending operating-lugs 34, that extend through and are adapted to play laterally in the openings 29 of the brake-ring 26 and the openings 31 of the locking-plate 30. The shaft 7 has on one side a longitudinal groove 35, in which is fitted a key 36, that also fits a groove in the driver. The latter has a set-screw 37, that engages the key. Hence the driver is firmly fixed to the shaft.

The operation of my improved friction-clutch is as follows: The hoisting-wheel or pulley is free to partly turn on or with reference to the shaft 7 to the extent limited by the length of the slots 28 in the brake-ring and the width of the openings 29 therein and of the openings 31 of the locking-plate 30. Lost motion between the brake-ring 26 and the hoisting-wheel or pulley causes the separating-ring 18, which is interposed between them, to move angularly with reference to the shaft, as will be understood. When the thickest section of the brake-ring is opposite the thinnest section of the hub of the hoisting-wheel or pulley, which is the position of the said brake-ring with reference to the hoisting-wheel or pulley hub when the openings 29 31 of the brake-ring and locking-plate 30, respectively, are in register and opposite sides thereof are engaged by the lugs 34 of the driver, the pulley or hoisting-wheel is locked to and caused to turn with the shaft 7 when the latter is turned, by means of the hand-wheel, to raise or lower the car of the dumb-waiter. When the hand-wheel is released, the car necessarily moves a very short distance up or down, depending on whether it is running light or loaded, and the corresponding movement of the hoisting-wheel or pulley causes the inclined face of its hub to act as an annular wedge against one side of the separating-ring, thus moving the latter angularly, creating friction between it and the hub and causing the opposite side of the separating-ring to be pressed against the inclined face of the brake-ring 26 with a gradually-increasing force, and the brake-ring is correspondingly pressed against one side of the brake-plate 12. The locking-plate 30, which is connected to the hoisting-wheel or pulley by the bolts 32, moves with the said wheel or pulley in gradually-increasing frictional contact with the opposite side of the brake-plate 12. Hence the wedge-hub 22, separating-ring 18, brake-ring 26, brake-plate 12, and locking-plate 30, all of which have relatively large friction-surfaces, approximating the diameter of the hoisting-wheel or pulley and remote from the center thereof, coact to create a gradually-increasing friction during a very limited partial rotation of the wheel or pulley to noiselessly and positively lock the latter to the shaft, and thereby lock the car against an upward or downward movement without jerking or jarring the car. Owing to the relatively large area of the coacting surfaces of the wedge-hub, separating-ring, brake-ring, and locking-plate, the wear thereof is minimized and the bolts 32, which enable them to be relatively adjusted laterally, afford means for taking up the wear, so that the durability of the device is very materially increased and it is enabled to be kept in perfect working order with very little attention.

I do not desire to limit myself to the precise construction, combination, and arrangement of devices hereinbefore described, as it is evident that modifications may be made therein without departing from the spirit of my invention and within the scope of the appended claims.

Having thus fully described my invention, what I claim as new, and desire to secure by Letters Patent, is—

1. A friction-clutch of the class described, comprising, in combination with a shaft and a wheel having limited independent revoluble movement thereon, an annular wedge element movable with the wheel, a similar element having limited revoluble movement independently of the wheel and shaft, a separating element, interposed between said annular wedge elements and having oppositely-disposed faces to frictionally contact with the faces of said annular wedge elements, and means to support the said separating element for universal angular movement with relation to the shaft and to prevent revoluble movement of said separating element, substantially as described.

2. A friction-clutch of the class described, comprising, in combination with a shaft and a wheel having limited independent revoluble movement thereon, an annular wedge element movable with the wheel, a similar element having limited revoluble movement independently of the wheel and shaft, a separating element interposed between said annular wedge elements and having oppositely-disposed faces to frictionally contact with the faces of said annular wedge elements, and a pivoted supporting element, independent of the shaft, to which the said separating element is pivotally attached for universal angular movement with relation to the shaft, substantially as described.

3. A friction-clutch of the class described, comprising, in combination with a shaft and a wheel having limited independent revoluble movement thereon, an annular wedge element movable with the wheel, a similar element having limited revoluble movement independently of the wheel and shaft, a separating-ring interposed between said annular wedge elements and having oppositely-disposed faces to frictionally contact with the faces of said annular wedge elements, and a pivoted yoke having a support independent of the shaft, said yoke being movable in a plane at right angles to the shaft, said separating-ring being pivotally supported by said yoke and movable in a plane at right angles to that of the plane of movement thereof, and hence having universal angular movement with reference to the shaft, substantially as described.

4. In a friction-clutch of the class described, the combination of a revoluble shaft, a wheel having partial independent revoluble movement thereon and provided with an annular wedge element, a brake element having partial independent revoluble movement on the shaft and having an annular wedge-face to coact with the wedge element of the wheel, a fixed brake element having one face opposed to the opposite side of the first-mentioned brake element, for frictional contact therewith, a locking element opposed to the opposite face of the fixed brake element, and connected to the wheel for independent partial revoluble movement on the shaft therewith, means to limit such movement of the locking element independently of the shaft, and a separating element between the opposing faces of the wedge element of the wheel and the annular wedge of the brake element, substantially as described.

5. In a friction-clutch of the class described, the combination of a revoluble shaft, a wheel having partial independent revoluble movement thereon and provided with an annular wedge element, a brake element having partial independent revoluble movement on the shaft and having an annular wedge-face to coact with the wedge element of the wheel, a fixed brake element having oppositely-disposed friction-faces, one of which is opposed to one side of the partially-revoluble brake element, a locking element having a friction-face opposed to the other side of the fixed brake element, a connection, angularly movable with relation to the partially-revoluble brake element, between the wheel and the locking element, to cause the latter to move with the wheel, means movable with the shaft, to limit the independent revoluble movements of the partially-revoluble brake element and locking element and a separating element between the opposing faces of the wedge element of the wheel and the annular wedge of the brake element, substantially as described.

6. In a friction-clutch of the class described, the combination of a revoluble shaft, a wheel having partial independent revoluble movement thereon and provided with an annular wedge element, a brake element having partial independent revoluble movement on the shaft and having an annular wedge-face to coact with the wedge element of the wheel, a fixed brake element having oppositely-disposed friction-faces, one of which is opposed to one side of the partially-revoluble brake element, a locking element having a friction-face opposed to the other side of the fixed brake element, a connection, angularly movable with relation to the partially-revoluble brake element, between the wheel and the locking element, to cause the latter to move with the wheel, means, movable with the shaft, to limit the independent revoluble movements of the partially-revoluble brake element and locking element, and means to adjust the locking element to take up the wear between the opposing friction-faces of the clutch elements, substantially as described.

7. In a friction-clutch of the class described, the combination of a revoluble shaft, a wheel having partial independent revoluble movement thereon and provided with an annular wedge element, a brake element having partial independent revoluble movement on the shaft and having an annular wedge-face to coact with the wedge element of the wheel, a fixed brake element having oppositely-disposed friction-faces, one of which is opposed to one side of the partially-revoluble brake element, a locking element having a friction-face opposed to the other side of the fixed brake element, a connection, angularly movable with relation to the partially-revoluble brake element, between the wheel and the locking element, to cause the latter to move with the wheel, and a driver, fixed to the shaft, said driver, locking element and partially independently revoluble brake element having coacting devices to limit the independent movements of said brake element and locking element, and hence also the wheel, substantially as described.

8. In a friction-clutch of the class described, the combination of a revoluble shaft, a wheel having partial independent revoluble movement thereon and provided with an annular wedge element, a brake-ring having openings 28, 29, provided with an annular wedge-face, and being mounted on the shaft for partial independent rotation, a fixed brake-plate to bear against one side of said brake-ring, a locking-plate having partial independent revoluble movement on the shaft and provided with openings 31 to move into and out of register with the openings 29 of the brake-ring, connections between the locking-plate, and wheel, extending through and having limited movement in the openings 28 of the brake-ring, and a driver, fixed to the shaft and having lugs extending into and free to play in the openings 29 of the brake-ring and the openings 31 of the locking-plate, substantially as described.

9. In a friction-clutch of the class described, the combination of a revoluble shaft, a wheel having partial independent revoluble movement thereon and provided with an annular wedge element, an angularly-movable supporting element, independent of the shaft and having a relatively fixed support, a separating-ring carried by said angularly-movable supporting element and having angular movement at right angles to the plane of movement thereof, said separating-ring frictionally engaging the annular wedge element of the wheel, a brake-ring, having limited independent revoluble movement on the shaft and frictionally engaging the separating-ring, on the side opposite that which engages the annular wedge element of the wheel, a fixed brake-plate frictionally engaging the brake-ring, a locking-plate, having limited revoluble movement on the shaft and connected to and movable with the wheel, said locking-plate frictionally engaging the brake-plate, and means carried by the shaft to limit the independent revoluble movement of the brake-ring and locking-plate, and hence also of the wheel, substantially as described.

10. In a friction-clutch of the class described, the combination of supports spaced apart, a shaft having its bearings in said supports, rods connecting the latter, a wheel having limited independent revoluble movement on the shaft and provided with an annular wedge element, a yoke pivotally connected to the rods for angular movement with respect to and extending across the shaft, a separating-ring having opposite friction-faces, one engaging the annular wedge element of the wheel, said separating-ring being carried by and pivotally connected to the yoke, for angular movement with respect to the shaft at right angles to the plane of movement of the yoke, a brake-ring, having limited independent revoluble movement on the shaft, and having an annular wedge-face that engages the other friction-face of the separating-ring, a brake-plate supported by the rods and bearing against the brake-ring, on the side of the latter opposite that which engages the separating-ring, a locking-plate bearing against the opposite side of the brake-plate and having limited independent revoluble movement on the shaft, connections between the wheel and the locking-plate and extending through and movable in openings with which the brake-ring is provided, the latter and the locking-plate being also provided with openings to move into and out of register by the angular movement of the locking-plate with respect to the brake-ring, and means, fixed to the shaft, having devices extending into and movable in the last-mentioned openings of the brake-ring and locking-plate, to limit the independent movement thereof, and hence also of the wheel, on the shaft, substantially as described.

In testimony whereof I have signed my name to this specification in the presence of two subscribing witnesses.

ALONZO SEDGWICK.

Witnesses:
  A. Noël,
  C. S. Cooley.